United States Patent [19]

Sato

[11] 4,015,536
[45] Apr. 5, 1977

[54] TRANSFER SYSTEM
[75] Inventor: Toshiaki Sato, Amagasaki, Japan
[73] Assignee: Unitika Ltd., Japan
[22] Filed: Sept. 29, 1975
[21] Appl. No.: 617,824
[30] Foreign Application Priority Data
Nov. 9, 1974 Japan .............................. 49-129201
Nov. 22, 1974 Japan .............................. 49-134638
Feb. 8, 1975 Japan .............................. 50-16702
[52] U.S. Cl. .................................... 104/88; 180/98
[51] Int. Cl.² ............................................ B61J 3/00
[58] Field of Search ........... 246/63 R, 63 C, 182 B, 246/30; 214/16.4 A, 83.36; 180/98; 104/88

[56] References Cited
UNITED STATES PATENTS 3,610,159 10/1971 Fickenscher ......................... 104/88
3,669,206 6/1972 Tax .................................... 246/63 C
3,750,804 8/1973 Lemelson ...................... 214/16.4 A
3,935,940 2/1976 Wentz .................................. 198/21

Primary Examiner—Trygve M. Blix
Assistant Examiner—Reinhard J. Eisenzopf
Attorney, Agent, or Firm—Whittemore, Hulbert & Belknap

[57] ABSTRACT

A system for transfer between work stations comprising a guided truck having guide wire sensors for detecting an electric current in a guide wire extending between the work stations. The truck is adapted to perform loading and unloading operations, and to depart, stop, travel, back and forth and return to its home base in response to signals from the sensors. A central control unit containing a sequence programmer is also provided.

7 Claims, 17 Drawing Figures

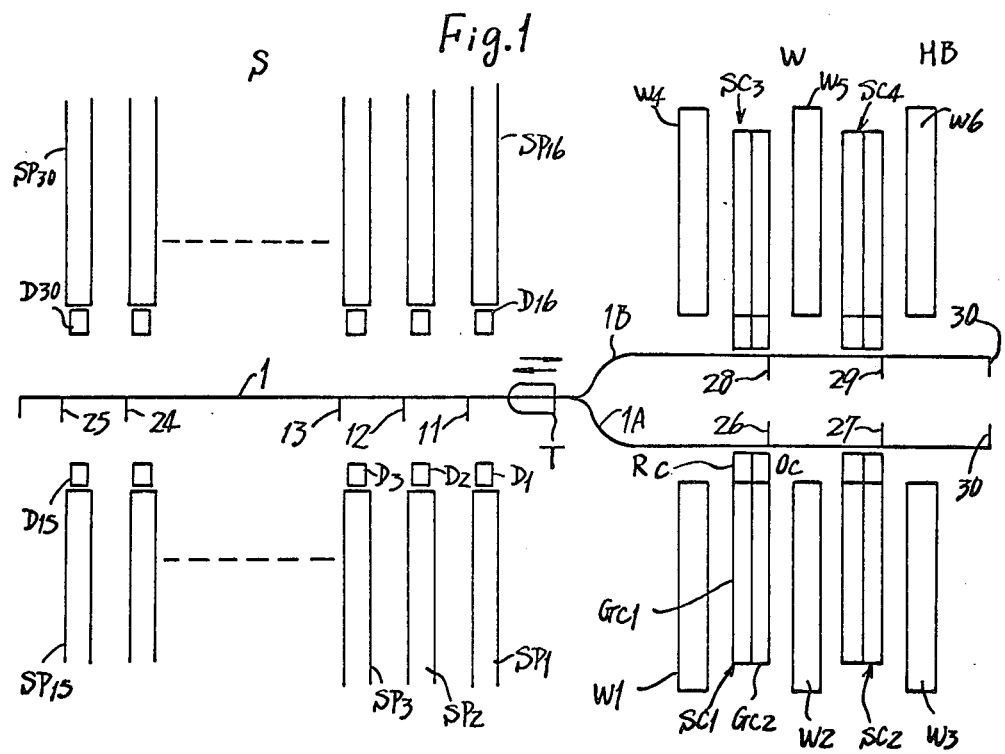
Fig. 1
Fig. 3
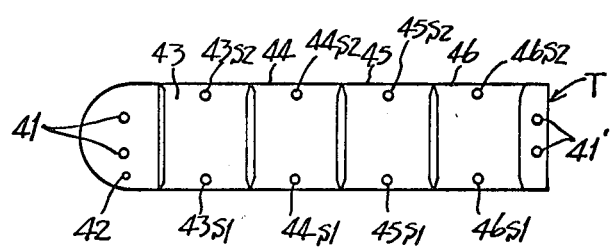
Fig. 4
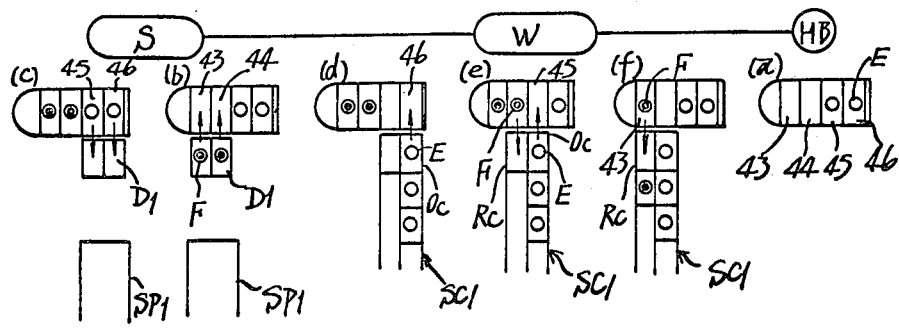

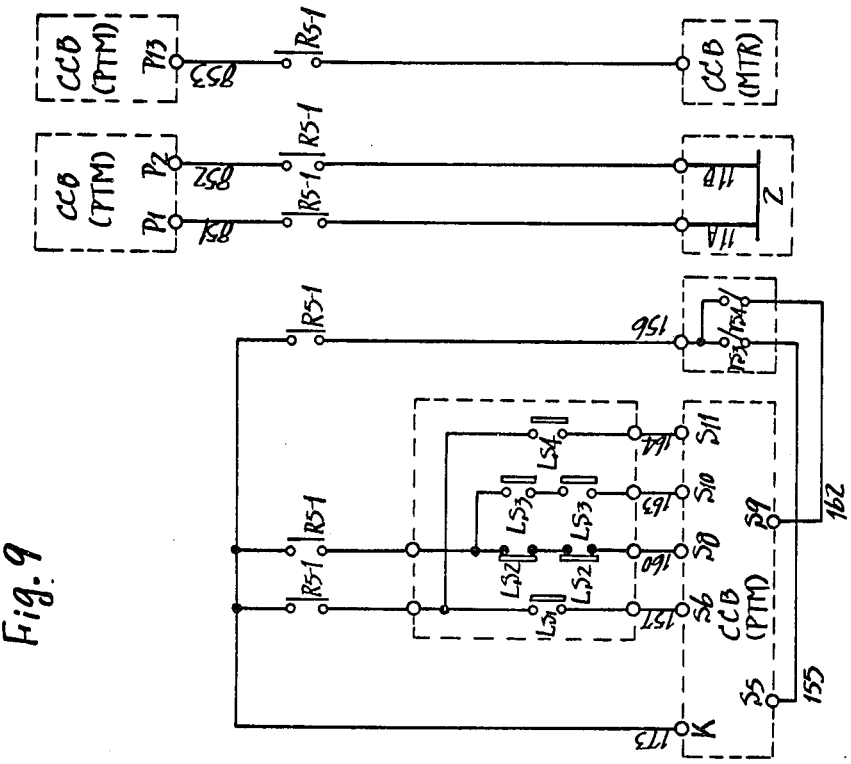
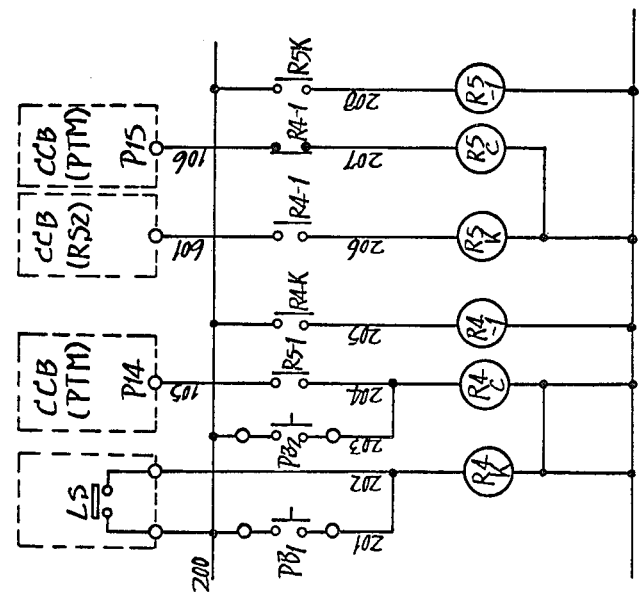
Fig. 9

| input switch / step number | S1 | S2 | S3 | S4 | S5 | S6 | S7 | S8 | S9 | S10 | S11 | S12 | S13 | S14 | S15 | S16 | S17 | S18 | S19 | S20 | S21 |
|---|---|---|---|---|---|---|---|---|---|---|---|---|---|---|---|---|---|---|---|---|---|
| 1 | ▬ | | | | | | | | | | | | | | | | | | | | |
| 2 | | ▬ | | | | | | | | | | | | | | | | | | | |
| 3 | | | ▬ | | | | | | | | | | | | | | | | | | |
| 4 | | | | ▬ | | | | | | | | | | | | | | | | | |
| 5 | | | | | ▬ | | | | | | | | | | | | | | | | |
| 6 | | | | | | ▬ | | | | | | | | | | | | | | | |
| 7 | | | | | | | ▬ | | | | | | | | | | | | | | |
| 8 | | | | | | | | ▬ | | | | | | | | | | | | | |
| 9 | | | | | | | | | ▬ | | | | | | | | | | | | |
| 10 | | | | | | | | | | ▬ | | | | | | | | | | | |
| 11 | | | | | | | | | | | ▬ | | | | | | | | | | |
| 12 | | | | | | | | | | | | ▬ | | | | | | | | | |
| 13 | | | | | | | | | | | | | ▬ | | | | | | | | |
| 14 | | | | | | | | | | | | | | ▬ | | | | | | | |
| 15 | | | | | | | | | | | | | | | ▬ | | | | | | |
| 16 | | | | | | | | | | | | | | | | ▬ | | | | | |
| 17 | | | | | | | | | | | | | | | | | ▬ | | | | |
| 18 | | | | | | | | | | | | | | | | | | ▬ | | | |
| 19 | | | | | | | | | | | | | | | | | | | ▬ | | |
| 20 | | | | | | | | | | | | | | | | | | | | ▬ | |
| 21 | | | | | | | | | | | | | | | | | | | | | ▬ |

TRANSFER SYSTEM

BACKGROUND AND SUMMARY OF THE INVENTION

The present invention relates to a transfer system for transfer between stations and more particularly a manless transfer system wherein the presence or absence of an electric current in a guide wire is detected to perform guidance and materials handling operation is automated.

For example, in textile mills the operation for conveying intermediate products to the next process requires a large number of workers since the products are subdivided, become complicated and sharply increase in number as they are passed through a series of subsequent processes. Generally, this conveying operation is manually performed with the products packed in boxes or carried on a simple pushcart. As a result, in the after-process many workers are required who carry the products from one place to another, and the need for labor-saving has been keenly felt.

With the above in mind, the present invention is intended to provide a guided truck adapted to automatically carry out loading and unloading between work stations to greatly reduce the number of workers while achieving timely transfer by means of centralized control, thereby increasing the transfer efficiency.

Another object of the present invention is to provided a system wherein an energized region between a baggage delivery location and a baggage reception location on a guide wire which guides a guided truck is variably set by means of centralized control, thereby eliminating the disadvantages inherent in the conventional complicated control mechanism, reducing the number of electric contacts required, and simplifying the control mechanism, it being noted that in the conventional system, at a predetermined truck stop position the guide wire is formed with a deengergized discontinuous region, whereby the truck can be stopped at said predetermined position, or the guide wire itself is divided into a plurality of sections so that each section can be selectively energized or deenergized to enable the truck to be stopped at at predetermined position.

A still further object of the present invention is to provide a system wherein the most urgent object of transfer is selected as the next object of transfer to prevent any transfer site from being kept waiting for more than the transfer wait limit, thereby avoiding the decrease of the transfer efficiency in the two successive processes, and a congestion or shortage of transfer containers.

Yet another object of the present invention is to provide a system wherein when there is a subsequent transfer demand signal, the guided truck is exempted from going back to its home base, thereby promoting the transfer cycle.

Other features and advantages of the present invention will be understood from the following description of the embodiments thereof illustrated in the accompanying drawings, in which:

FIG. 1 is a schematic layout diagram of the entire system;

FIG. 3 is a schematic view of a truck;

FIG. 4 is a view explanatory of the truck;

FIGS. 5 through 7 are wiring diagrams for a central control unit;

Figure 10:
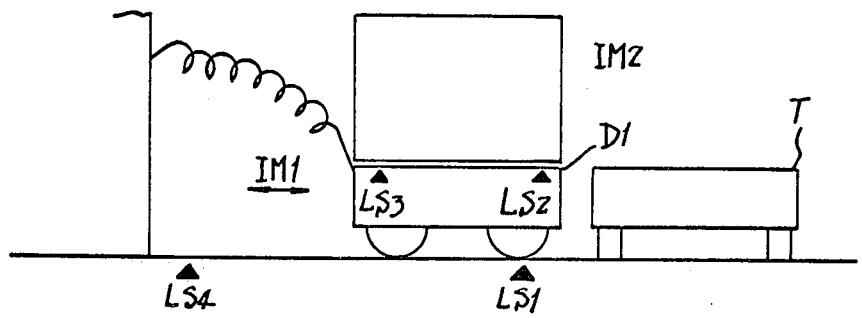
Figure 12:
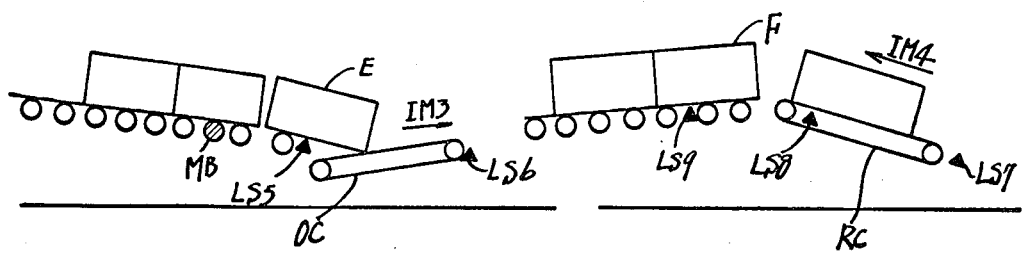
Figure 8:
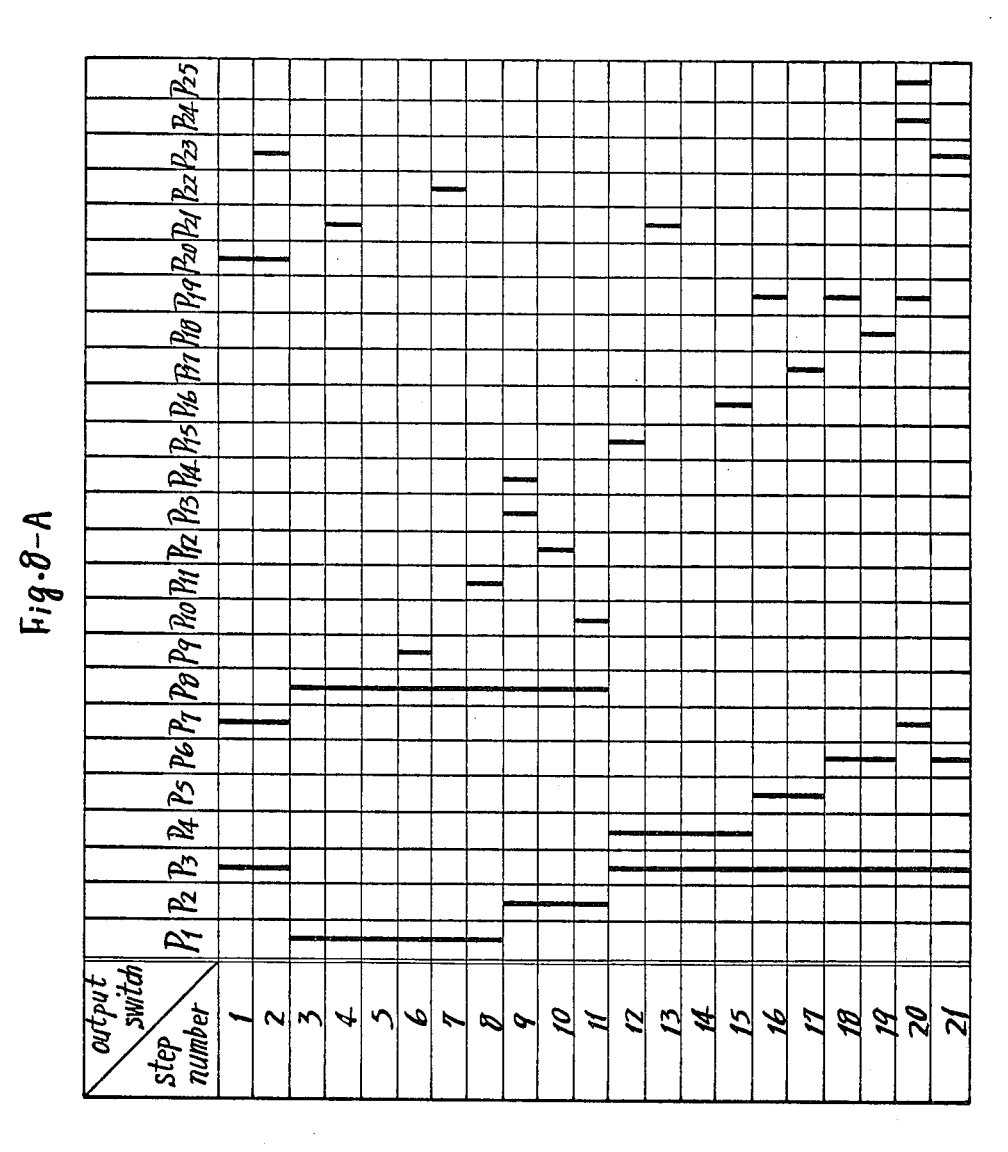
Figure 8:
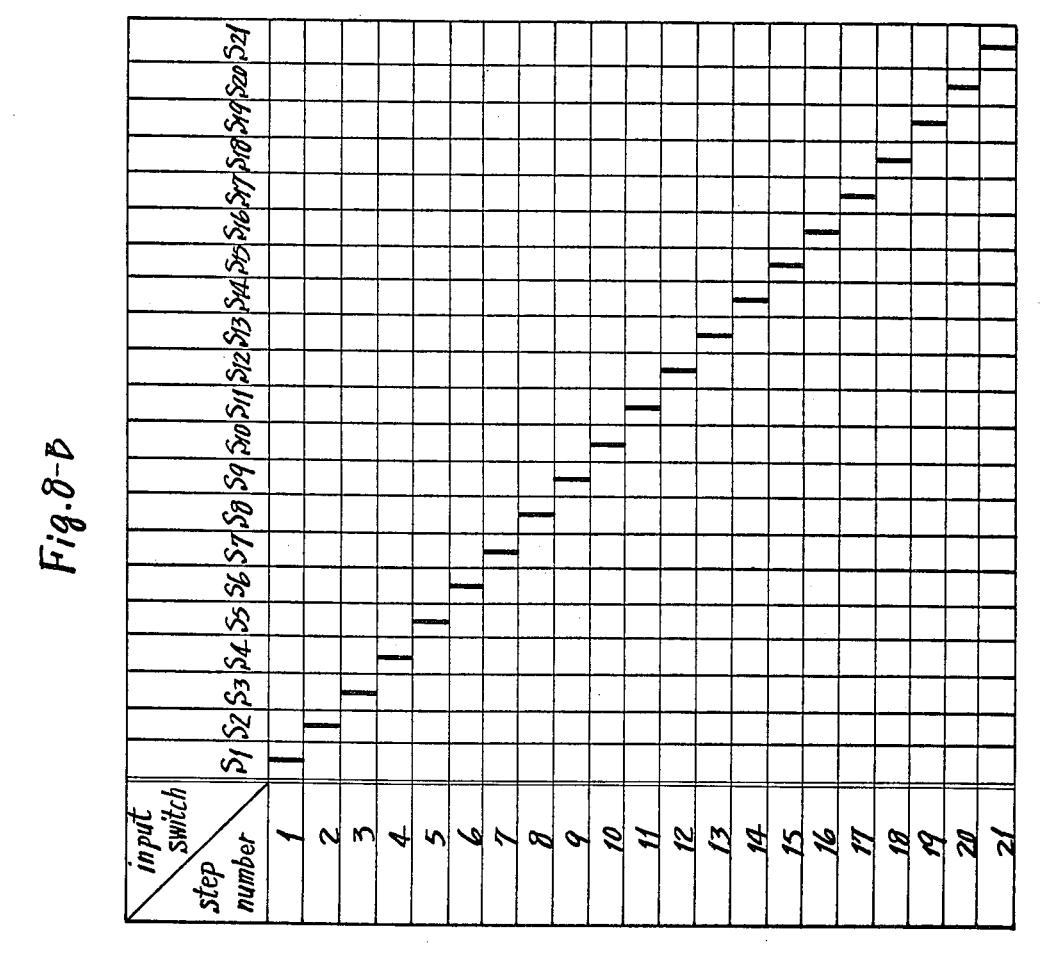
Figure 11:
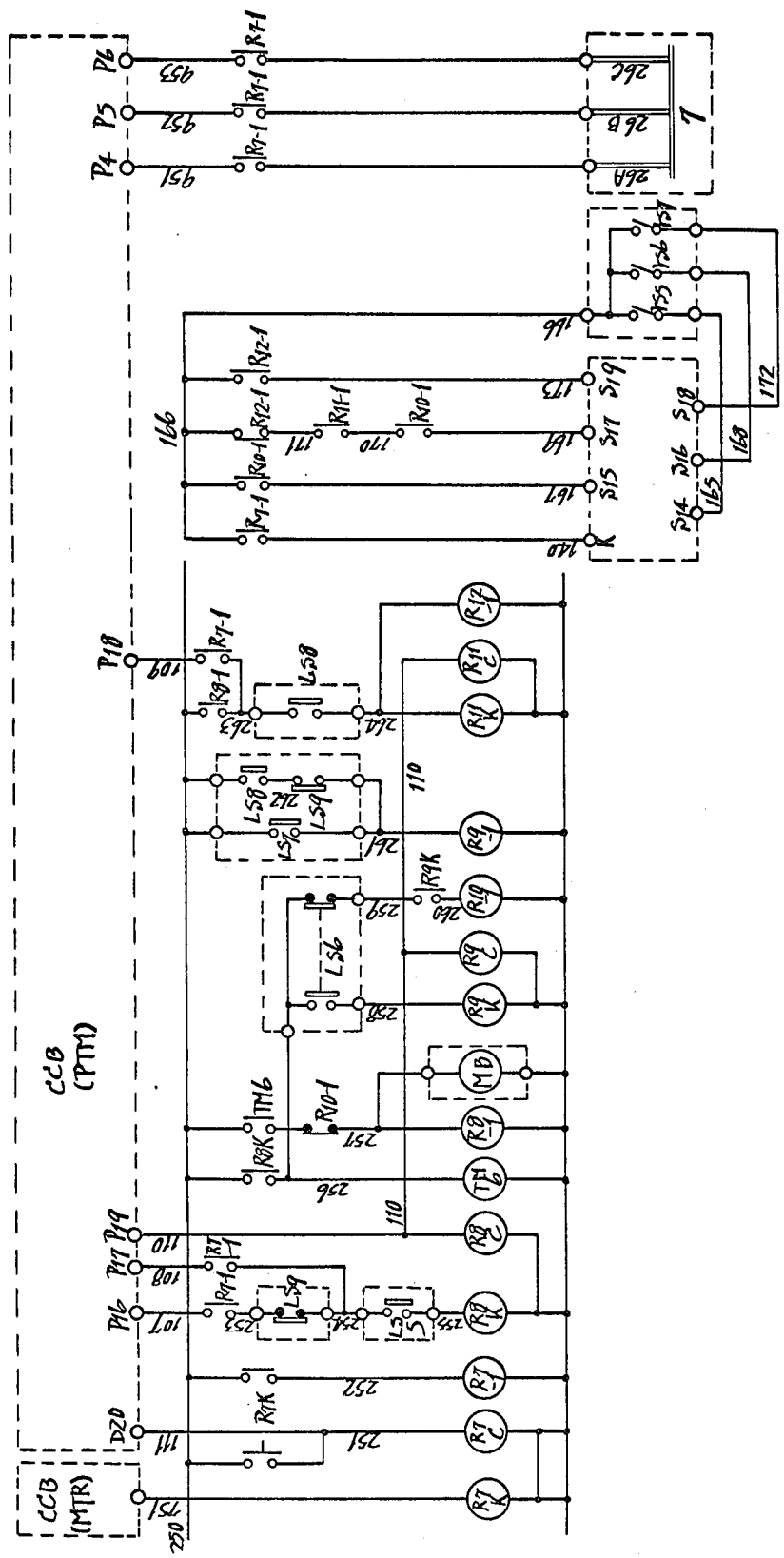
Figure 13:
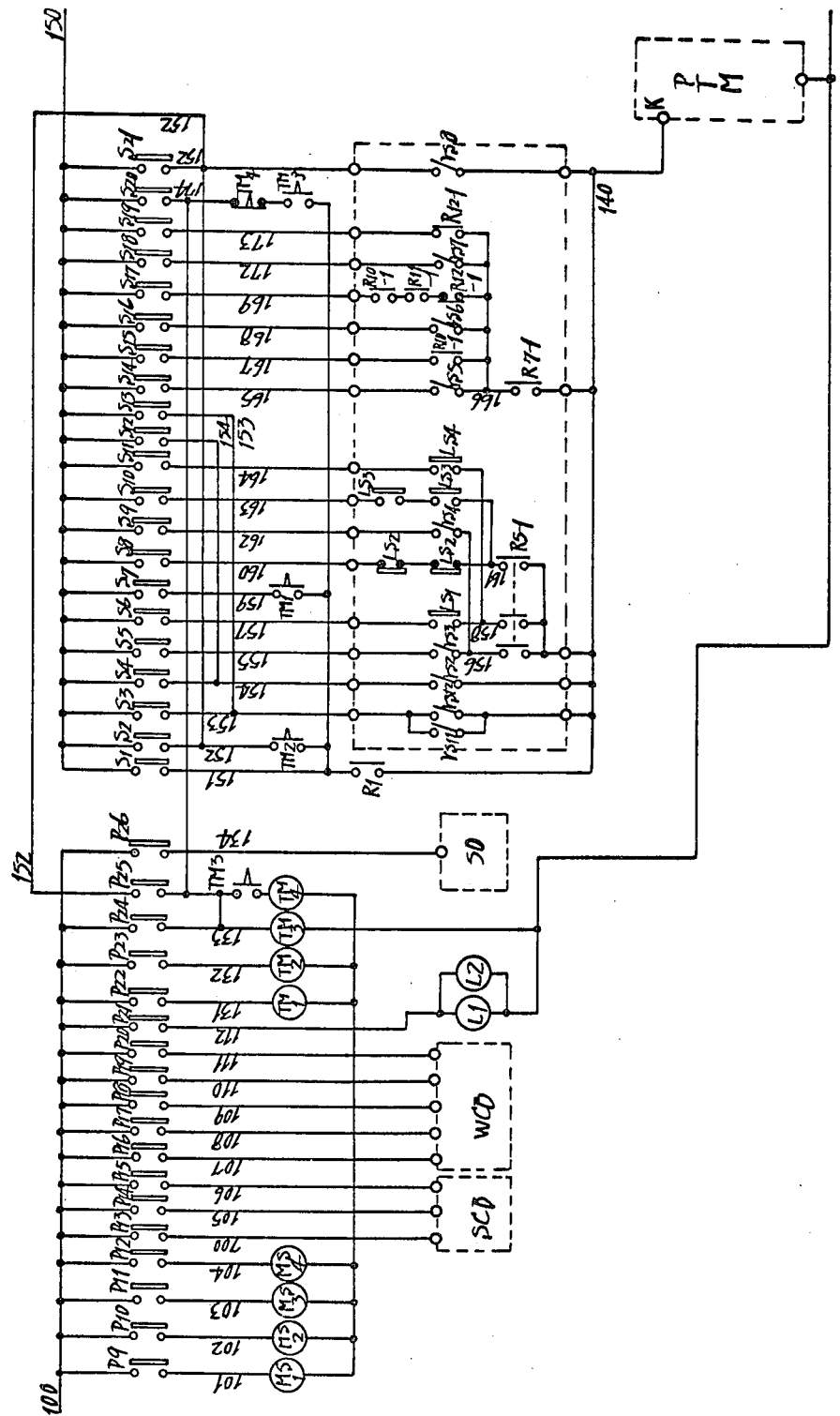
Figure 14:
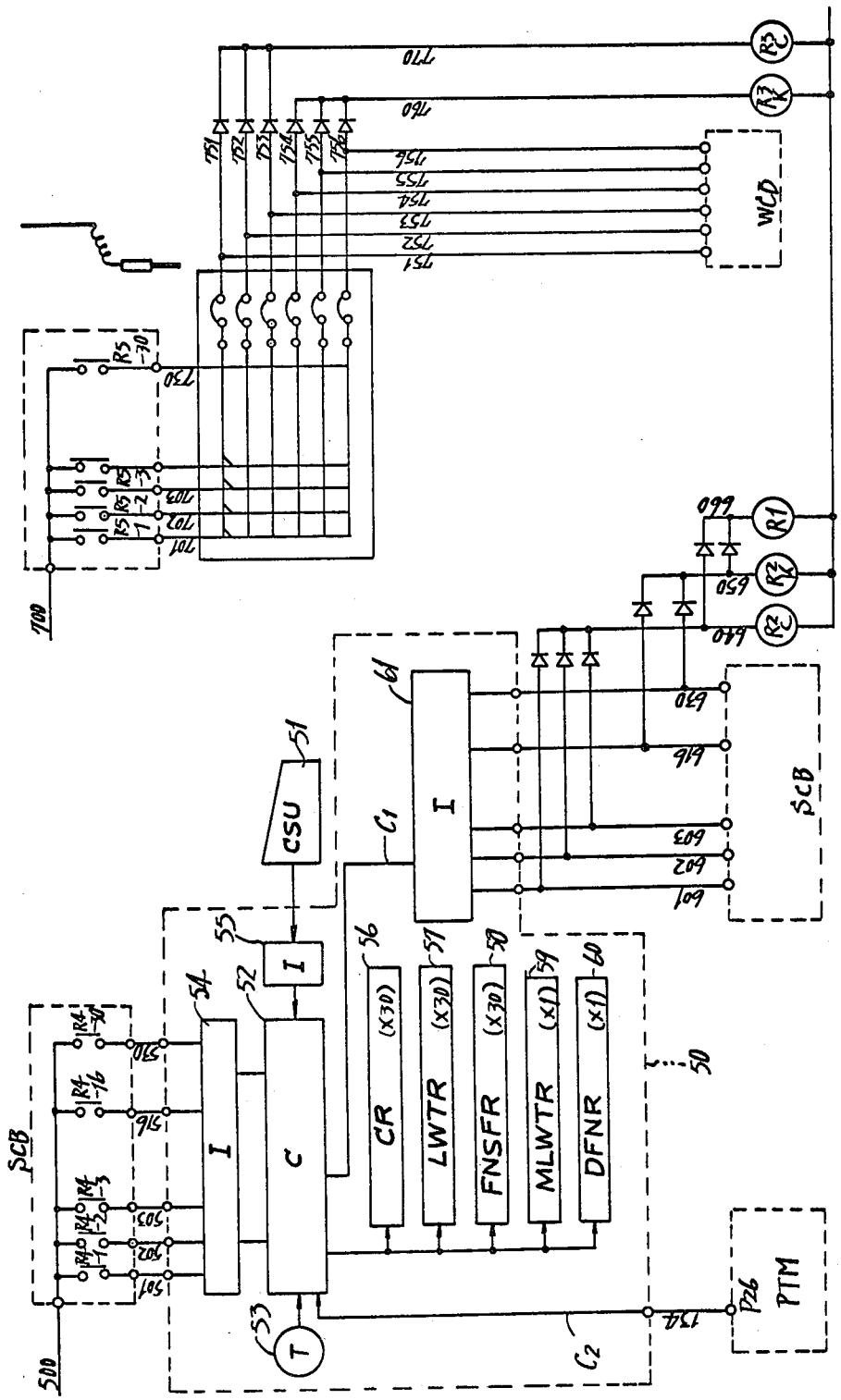

FIGS 8-A and 8-B are time charts for a sequence programmer installed in the central control unit;

FIG. 9 is a wiring diagram for a control unit on the spinning frame side;

FIG. 10 is a view explanatory of the operation of a relay truck;

FIG. 11 is a wiring diagram for a control unit on the winder side;

FIG. 12 is a view explanatory of the operation of a conveyer system;

FIGS. 13 and 14 are wiring diagrams for another embodiment of the present invention; and FIGS. 15-A and 15-B are time charts for a sequence programmer for said second embodiment.

In FIG. 1, a guide wire 1 for guiding a guided truck T (hereinafter referred to as the truck) is embedded; for example, between the spinning room S and winding room W of a textile mill. In the spinning room S, two groups of spinning frames $SP_1$–$SP_{15}$ and $SP_{16}$–$SP_{30}$ are disposed on both sides of the guide wire 1, while a plurality of winding frame conveyer systems $SC_1$–$SC_4$ for collecting and delivering full and empty bobbin boxes F and E (hereinafter referred to as full boxes and empty boxes, respectively) from a plurality of winding frames $W_1$–$W_6$ are disposed adjacent said guide wire 1. Each of the conveyor systems $SC_1$–$SC_4$ comprises a reception conveyer RC and a delivery conveyer OC, and gravity conveyers $GC_1$ and $GC_2$ for storage connected to them. In addition, the guide wire 1 branches at the entrance to the winding room W to provide branch wires 1A and 1B which extend to flank the conveyer systems $SC_1$, $SC_2$ and $SC_3$, $SC_4$, respectively. The shunting of the truck 1 is effected by selectively energizing said branch wire 1A or 1B.

The stoppage of the truck 1 at predetermined positions is effected by selectively energizing the sections of the guide wire 1 extending to truck stop lines 11–25, 26–29 and 30 provided at positions corresponding to the spinning frames $SP_{1-15}$ or $SP_{16}$–$SP_{30}$, winding frame conveyer systems $SC_1$–$SC_4$ and a truck home base HB, respectively, such energization being controlled by a central control unit CCB, as will be later described.

Figure 2:
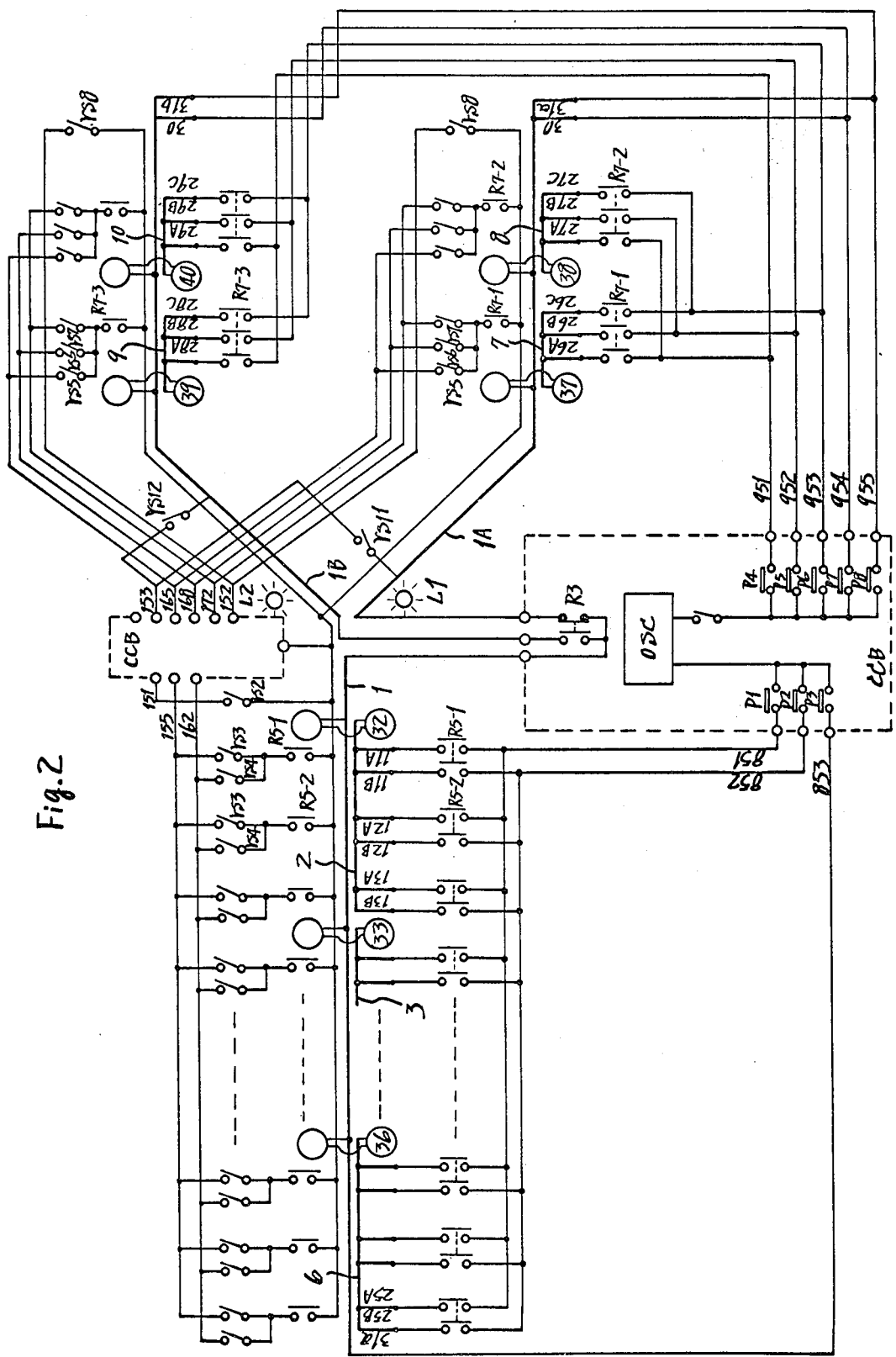
FIG. 2 is a control system diagram for a guide wire.

Thus, in FIG. 2, the truck stop lines 11–25 associated with the spinning frames $SP_1$–$SP_{15}$and $SP_{16}$–$SP_{30}$ consist of the truck stop lines 11A–25A and the second truck stop lines 11B–25B, respectively. These truck stop lines 11A, 11B–25A, 25B, for example, are divided into five blocs and connected to sub-wires 2–6 disposed parallel to and adjacent said guide wire 1. The ends of said sub-wires 2–6 on the winding room W side are connected to the guide wire 1 through speed reduction coils 32–36, respectively. In addition, the truck stop lines 11–25 may be provided on both sides of the guide wire 1 so as to correspond to the spinning frames $SP_1$–$SP_{15}$ and $SP_{16}$–$SP_{30}$. Further, the truck stop lines 26–29 associated with the winding room conveyer systems $SC_1$–$SC_4$ consist of the first truck stop lines 26A–29A, the second truck stop lines 26B–29B and the third truck stop lines 26C–29C, respectively. These truck stop lines 26A, 26B, 26C–29A, 29B, 29C, for example, are divided into four blocks and connected to sub-wires 7–10 disposed parallel to and adjacent branch wires 1A and 1B extending from the guide wire 1. The ends of said sub-wires 7–10 on the spinning room S side are connected to said branch wires 1A and 1B through speed reduction coils 37–40, respectively. The truck stop lines 30 associated with the home base HB are directly connected to the branch wires 1A and 1B adjacent the ends of the latter. Further, the guide wire 1 and branch wires 1A, 1B have end lines 31a and 31b, respectively, directly connected to the terminal ends thereof. The transfer of full and empty boxes F and E between the spinning frames $SP_1$–$SP_{30}$ and the truck T is effected by relay trucks $D_1$–$D_{30}$ adapted to shuttle between the spinning frames $SP_1$–$SP_{30}$ and the guide wire 1.

In FIG. 3, the truck T is provided with guide wire sensors 41 and 41' adapted to be positioned on both sides of the guide wire 1 and of the branch wires 1A, 1B for detecting the currents in said wires when the truck is traveling, so that voltages induced in the sensors are detected to drive a traveling motor (not shown) and the voltage differential between the sensors is sensed to control the truck T so that the latter may travel along the wires 1, 1A and 1B. In addition, the sensors 41 are used for forward movement and the sensors 41' for reverse movement. The truck T is also provided with a speed reduction sensor 42 at a position for detecting voltages in the speed reduction coils 32–40 to issue a speed reducing command to the traveling motor. Finally, the truck T is provided, for example, with four baggage conveyers 43–46 adapted for rotation at a right angle to the direction of travel of the truck and to carry baggage thereon, and baggage sensors $43S_1$, $43S_2$–$46S_1$, $46S_2$ disposed on both sides of the entrances to the respective conveyers 43–46.

FIG. 4 shows a diagram explanatory of the operating conditions a–f of the truck T, therein the truck is shown stopped at the home base HB with empty boxes E loaded on the third and fourth baggage conveyers 45 and 46, it being programmed so that from the time the truck starts from the home base HB until it comes back, the operations shown in FIG. 4 are performed in connection with the detections by the speed reduction sensor 42, guide wire sensors 41, 41' and baggage sensors $43S_1$, $43S_2$–$46S_1$, $46S_2$. Such programs will now be described.

a. In the program 1, with the truck in the wait condition (shown at a in FIG. 4), when, due to a transfer demand signal from, e. g., the spinning frame $SP_1$, the home base truck stop line 30 in FIG. 2 is deenergized and the section between the end line 31b and the first truck stop line 11A of the spinning frame $SP_1$ is energized (as will be later described), such electric current is detected to effect changeover of the guide wire sensors to 41 for forward movement and the truck T is moved in the forward direction toward the spinning room S at normal speed, and the subsequent detection of the voltage in the speed reduction coil 32 causes stepping up to the program 2.

b. In the program 2, a command for forward movement at low speed is issued to the truck T, and when the truck comes across the first truck stop line 11A, it is stopped and step-up to the program 3 is effected.

c. In the program 3, with the baggage sensors $43S_2$ and $44S_2$ in deenergized condition, the first and second baggage conveyers 43 and 44 are driven in the baggage receiving direction to load the truck with full boxes F (as shown at b in FIG. 4) and when the sensors $43S_2$ and $44S_2$ are energized as a result of the full boxes F transferred from the relay truck $D_1$, the driving of the baggage conveyers 43 and 44 is stopped and step-up to the program 4 is effected.

d. In the program 4, a command for inching movement is issued to the truck T which is departing therefrom as a result of the first truck stop line 11A being deenergized and the second truck stop line 11B being energized, and when it comes across the second truck stop line 11B, the truck is stopped and step-up to the program 5 is effected.

e. In the program 5, with the baggage sensors $45S_1$ and $46S_1$ in energized condition, there is issued a command for driving the third and fourth baggage conveyers 45 and 46 to unload the empty boxes E (as shown at c in FIG. 4), and when the baggage sensors $45S_1$ and $46S_1$ are deenergized as the empty boxes E are transferred onto the relay truck $D_1$, the driving of the baggage conveyers 45 and 46 is stopped and the guide wire sensors are changed over to 41' for reverse movement and simultaneously step-up to the program 6 is effected.

f. In the program 6, for example when the winding frame $W_1$ is set, the second truck stop line 11B is deenergized and the section between the end line 31a and the first truck stop line 26A of the winding frame conveyer $SC_1$ is energized (as will be later described), so that the current therein is detected by the guide wire sensors 41' to move the truck T in the reverse direction toward the winding room W at normal speed and when the speed reduction coil 37 is detected, step-up to the program 7 is effected.

g. In the program 7, a command for reduction of speed is issued to the truck T, and when the truck comes across the first truck stop line 26A, the truck T is stopped and simultaneously step-up to the program 8 is effected.

h. In the program 8, with the baggage sensor $46S_2$ in deenergized condition, there is issued a command for driving the fourth baggage conveyer 46 to load empty boxes E (as shown at d in FIG. 4), and when the baggage sensor $46S_2$ is energized as a result of the transfer of the empty boxes E from the delivery conveyer OC, the driving of the baggage conveyer 46 is stopped and step-up to the program 9 is effected.

i. In the program 9, a command for inching movement is issued to the truck which is departing therefrom as a result of the first truck stop line 26A being deenergized and the second truck stop line 26B being energized (as will be later described), and when the truck comes across the second truck stop line 26B, the truck T is stopped and simultaneously step-up to the program 10 is effected.

j. In the program 10, with the baggage sensor $44S_1$ in energized condition and the baggage sensor $45S_2$ in deenergized condition, there is issued a command for driving the second and third baggage conveyers 44 and 45 to effect the unloading of the full boxes F and the loading of the empty boxes E, respectively, (as shown at e in FIG. 4), and when the baggage sensor $44S_1$ is deenergized while the baggage sensor $45S_2$ is energized as a result of the full boxes F being transferred onto the reception conveyer RC and the empty boxes E being transferred from the delivery conveyer OC, the driving of the baggage conveyers 44 and 45 is stopped and step-up to the program 11 is effected.

k. In the program 11, a command for inching movement is issued to the truck T which is departing as a result of the second truck stop line 26B being deenergized and the third truck stop line 26C being energized (as will be later described), and when the truck T comes across the third truck stop line 26C, it is stopped and simultaneously step-up to the program 12 is effected.

l. In the program 12, with the baggage sensors 43S₁ in energized condition, there is issued a command for driving the first baggage conveyer 43 to unload the full boxes F (as shown at f in FIG. 4), and when the baggage sensor 43S₁ is deenergized as the full boxes F are transferred onto the reception conveyer RC, the driving of the baggage conveyer 43 is stopped and step-up to the program 13 is effected.

m. In the program 13, the materials handling operation is completed. Thus, when the third truck stop line 26C is deenergized while the section between the end line 31a and the truck stop line 30 of the home base HB is energized (as will be later described), the truck T is moved in the reverse direction toward the home base HB at normal speed by the detection of current by the guide wire sensors 42'. When the truck T comes across the truck stop line 30, it is stopped and simultaneously returns to the program 1.

Figure 5:
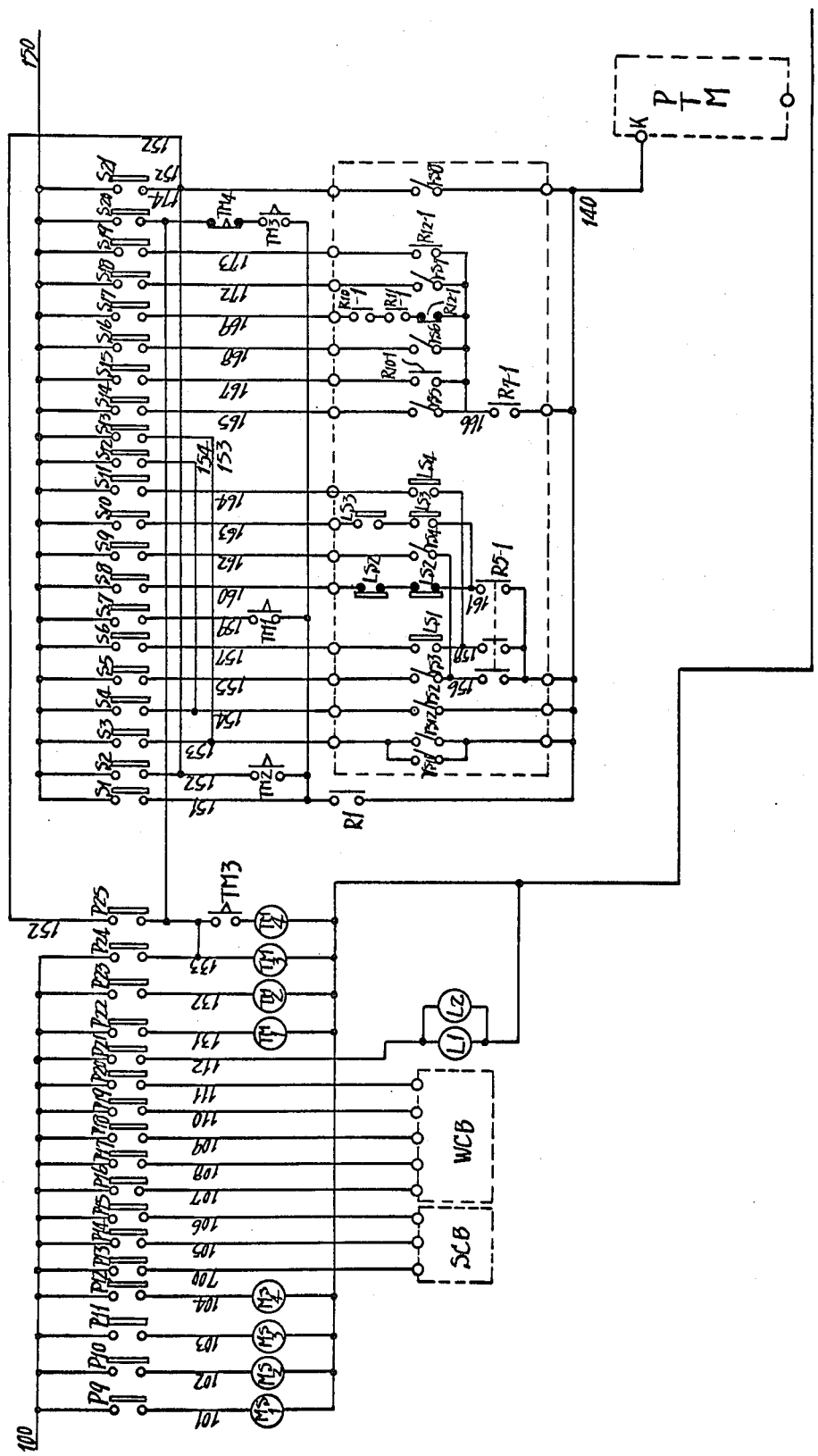
Figure 6:
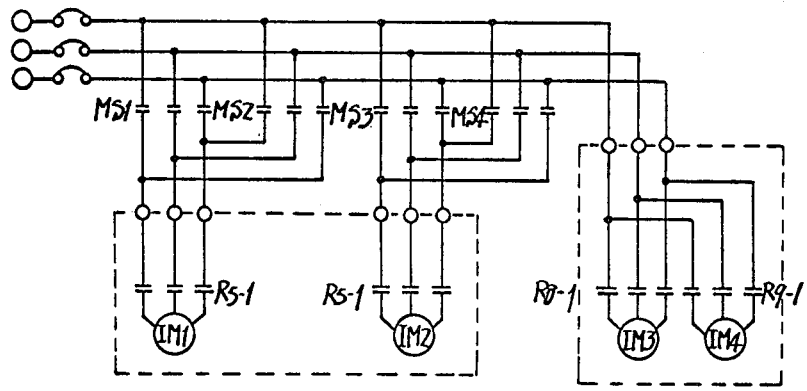
Figure 7:
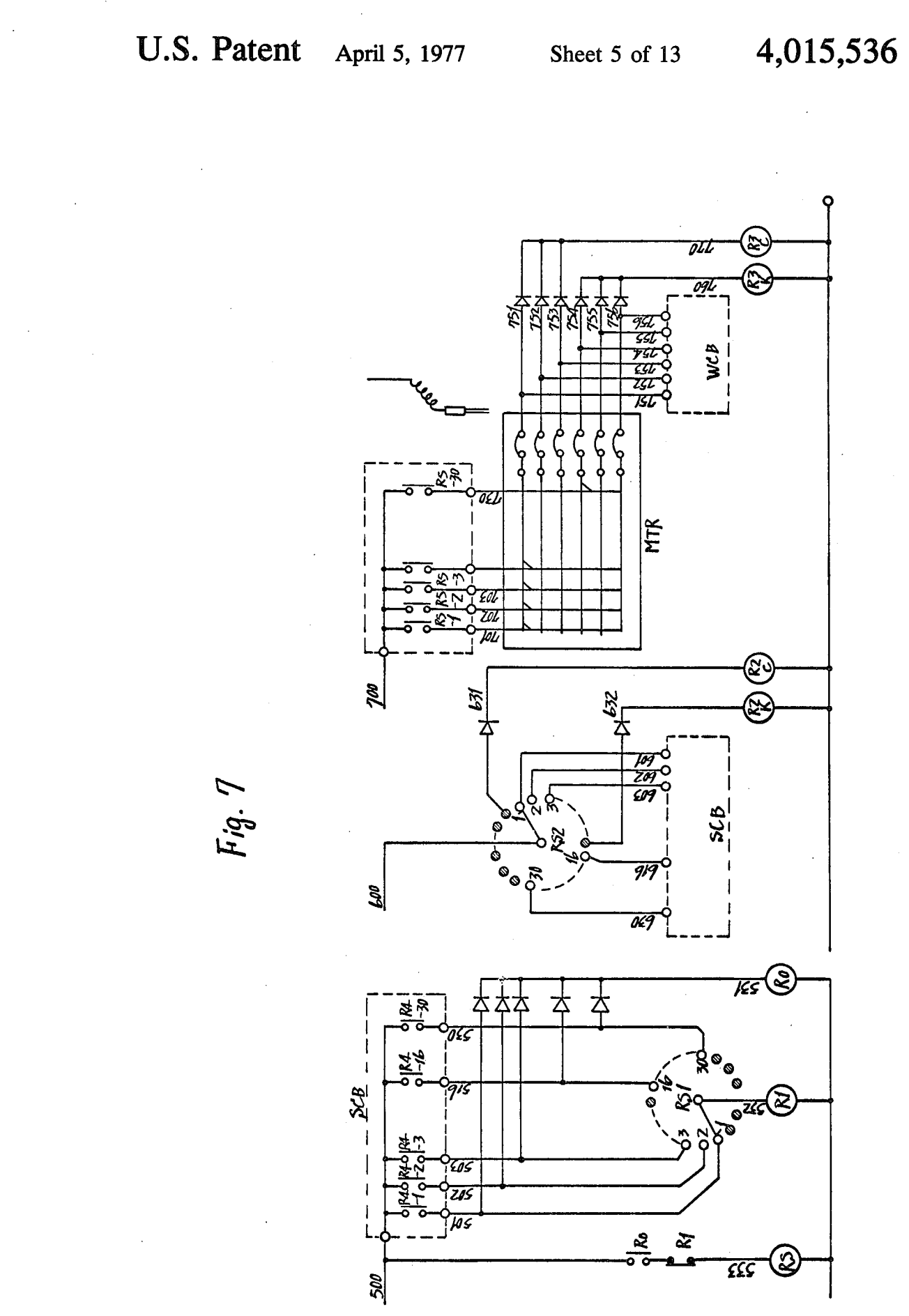

FIGS. 5–7 show the wiring of the central control unit CCB. Designated at PTM is a sequence programmer contained in the central control unit CCB and comprising output switches $P_1$–$P_{25}$ for operation and input switches $S_1$–$S_{21}$ for step up, the time chart thereof being shown in FIG. 8. FIG. 9 shows the wiring of a spinning frame control unit SCB and FIG. 11 shows the wiring of a winding frame control unit WCB.

The operation of these units will now be described particularly with reference to FIGS. 5 and, 8-A and 8-B. An instance will be described in which with the doffing operation of the spinning frame SP₁ completed, full boxes F containing the full bobbins from said spinning frame are to be transferred to the winding frame conveyer SC₁ corresponding to the winding frame W₁ where the rewinding of said full bobbins will be performed. In addition, the winding frame conveyer SC₁ is preset by a pin board matrix MTR shown in FIG. 7.

1. At first, the sequence programmer PTM is at the step 1, with the output switches P₃ and P₇ closed, the section between the end line 31a and the home base truck stop line 30 in FIG. 2 energized, and the truck T stopped at the home base HB. When the doffing operation of the spinning frame SP₁ is completed, the full bobbins are fed from both sides of the spinning frame SP₁ into two empty boxes on the relay truck positioned at the end of the spinning frame SP₁. In response to a transfer demand signal issued upon the boxes becoming full (by manually operating the push-button PB₁ in the line 201 in FIG. 9 or automatically closing the switch LS in the line 202), the keep relay R4K in the line 202 in FIG. 9 is energized to energize the relay R4-1 in the line 205 by means of its contact R4K.

2. Simultaneously therewith, the contact R4-1 in the line 500 in FIG. 7 energizes the relay RO through the lines 501 and 531 to energize the rotary relay RS in the line 532 through the contact RO in the line 500, whereby the rotor RS1 is advanced in such a manner that its contact successively scans the terminals and when it meets the terminal 1 in the line 500, the relay R1 in the line 532 is energized to deenergize the rotary relay RS, thereby designating the spinning frame SP1.

3. An address signal is issued to the line 601 through the rotor RS2 in the line 600 operatively connected to the rotor RS1 to energize the keep relay R5K through the line 206 in FIG. 9. With the relay R5-1 in the line 208 energized thereby, the relay truck driving motor IM1 and baggage conveyer driving motor IM2 (these being shown in FIG. 6), the first and second truck stop lines 11A, 11B and the first and second arrival detecting reed switches rS3, rS4 (these being shown in FIG. 2), and the limit switches LS1–LS4 for detecting the completion of advance of the relay truck, delivery of the full boxes, reception of the empty boxes, and retraction of the relay truck (FIGS. 9 and 10) are connected to the central control unit CCB through the contact R5-1 of said relay R5-1. Thereafter, until the relay R5-1 in the line 208 is deenergized and the spinning frame designation is reset, only the signal from SP1 is fed to CCB while the command from CCB is delivered to SP1 alone.

4. On the other hand, as a result of the contact R1 in the line 151 in FIG. 5 being closed, PTM is stepped up to the step 2 through the line 140, closing the input switch S₂.

5. With the output switch P₂₃ closed, the timer TM2 in the line 132 in FIG. 5 is energized, and after a delay, PTM is stepped up to the step 3 by the delay contact TM2 in the line 152 in FIG. 5 through the contact R1 in the line 151, closing the input switch S₃. The purpose of said delay is to make allowance for truck braking and program step-up when there is a transfer demand immediately after the truck comes back to HB 6. With the input switches P₃, P₇ opened and P₁, P₈ closed, the home base truck stop line 30 in FIG. 2 is deenergized while the section between the end line 31b and the first truck stop line 11A associated with the spinning frame SP₁ is energized, so that the guide wire sensors change over to 41 and the truck T is moved in the forward direction at normal speed. The winding frame entrance passage detection reed switch rs11 in the line 153 causes PTM to step up to the step 4, closing the input switch S₄.

7. With the input switch P₂₁ closed, rotary lamps L1 and L2 are turned on through the line 112 in FIG. 5, and the spinning frame entrance passage detection reed switch rs2 causes PTM to step up to the step 5, closing the input switch S₅ and turning off the rotary lamps L1 and L2.

8. Just prior to the first stoppage of the truck at the spinning frame, PTM is stepped up to the step 6 by the arrival detection reed switch rs3 in the line 155 through the contact R5-1 in the line 156, closing the input switch S₆.

9. The truck T is stopped at the first truck stop line 11A, and the first and second baggage conveyers 43 and 44 are driven for reception of baggage, as described above (in paragraph c). With the output switch P₉ closed, the switch MS1 in the line 101 in FIG. 5 is closed to rotate the drive motor IM1 in the forward direction by its contact MS1 through the contact R5-1, thereby advancing the relay truck D₁. The truck advance completion detection limit switch LS1 in the line 157 causes PTM to step up to the step 7 through the contact R5-1 in the line 158, closing the input switch S₇.

10. With the output switch P₂₂ closed, the timer TM1 in the line 131 is closed, and after a delay, the delay contact TM1 in the line 159 causes PTM to step up to the step 8, closing the input switch S₈. The purpose of said delay is to make allowance for the first and second baggage conveyers 43 and 44 being driven for reception of baggage when the truck T is stopped.

11. With the output switch P₁₁ closed, the switch MS3 in the line 103 is closed to rotate the drive motor IM2 in the forward direction by its contact MS3 through the contact R5-1, thereby delivering the full boxes F. The box delivery completion detection limit switch LS2 in the line 160 causes PTM to step up to the step 9, closing the input switch $S_9$.

12. With the output switch $P_1$ opened and $P_2$ closed, the first truck stop line 11A in FIG. 2 is deenergized while the second truck stop line 11B is energized to inch the truck T. Simultaneously, with $P_{14}$ closed, the reset relay R4C in the line 204 in FIG. 9 is energized through the line 105 to reset the relay R4-1 in the line 205 and reset the transfer demand signal. Simultaneously, with $P_{13}$ closed, the guide wire 1 and the branch wire 1A are connected together as shown in FIG. 2 by the relay R3C in the line 770 through the line 700 and through the pin board matrix MTR from the contact R5-1 in the line 701, and a winding frame designation signal is passed through the line 751 to close the keep relay R7K of WCB in FIG. 11, so that the relay R7-1 in the line 252 is energized to close its contacts R7-1 in the lines 107, 108, 109, 166 and 951-953, thereby designating the winding frame conveyer $CS_1$. Just prior to the second stoppage at the spinning frame after said inching movement of the truck T, the inching movement completion detection reed switch rs4 causes PTM to step up to the step 10 through the contact R5-1 in the line 156, closing the input switch $S_{10}$. In addition, the truck T, after the second stoppage, performs delivery of the empty boxes E, as described above (in paragraph e).

13. With the output switch $P_{12}$ closed, the switch MS4 in the line 104 is closed and its contact MS4 in FIG. 6 causes the drive motor IM2 to be rotated in the reverse direction through the contact R5-1 to receive the empty boxes E. The reception completion detection limit switch $LS_3$ in the line 163 causes PTM to step up to the step 11 through the contact R5-1 in the line 161, closing the input switch $S_{11}$.

14. With the output switch $P_{10}$ closed, the switch $MS_2$ in the line 102 is closed and its contact $MS_2$ causes the drive motor IM1 to be rotated in the reverse direction through the contact R5-1 to retract the relay truck $D_1$. The relay truck retraction completion detection limit switch $LS_4$ in the line 164 causes PTM to step up to the step 12 through the contact R5-1 in the line 158, closing the input switch $S_{12}$.

15. With the output switches $P_2$, $P_8$ opened and $P_3$, $P_4$ closed, the second truck stop line 11B in FIG. 2 is deenergized and the section between the end line 31a and the first truck stop line 26A associated with the winding frame conveyer $SC_1$ is energized, whereby the truck T is moved in the reverse direction at normal speed. The spinning frame entrance and exit passage detection reed switch rs2 causes PTM to step up to the step 13, closing the input switch $S_{13}$. Simultaneously, with the output switch $P_{15}$ closed, the reset relay R5C in the line 207 in FIG. 9 is energized to reset the relay R5-1 in the line 208, thereby withdrawing the command to the spinning frame.

16. With the output switch $P_{21}$ closed, the rotary lamps L1 and L2 in the line 112 are turned on and the winding frame entrance and exit passage detection reed switch rs11 in the line 112 causes PTM to step up to the step 14, closing the input switch $S_{14}$ and turning off the rotary lamps L1 and L2.

17. Just prior to the first stoppage of the truck at the winding frame, the arrival detection reed switch rs5 in the line 165 causes PTM to step up to the step 15 through the contact R7-1, closing input switch $S_{15}$.

8. With the output switch $P_{16}$ closed, the first materials handling command is issued through the line 107, while the limit switch $LS_5$ (FIG 12) in the line 254 in FIG. 11 ascertains the presence of empty boxes E and the limit switch $LS_9$ (FIG. 12) in the line 253 ascertains that there is room for receiving two full boxes F, energizing the keep relay R8K in the line 255. After a delay by the timer TM6 in the line 256, the relay R8-1 in the line 257 is energized, causing its contacts R8-1 in FIG. 6 to drive the delivery motor IM3 for the delivery conveyer OC of the winding frame conveyer system $SC_1$. The passage of the empty boxes causes the energization of the keep relay R9K through the limit switch $LS_6$ (FIG. 12). The energization of the relay R10-1 in the line 260 after the passage causes the stoppage of the motor IM3 through the relay R8-1 in the line 257. At the same time, the contact R10-1 in the line 167 in FIG. 5 causes PTM to step up to the step 16 through the contact R7-1 in the line 166, closing the input switch $S_{16}$.

19. With the output switch $P_4$ opened and $P_5$ closed, the first truck stop line 26A in FIG. 2 is deenergized while the second truck stop line 26B is energized, causing the inching movement of the truck T. At the same time, with $P_{19}$ closed, the reset relays R8C and R9C in FIG. 11 are energized through the line 110, withdrawing the materials handling command. Further, after said inching movement of the truck T and just prior to the second stoppage of the truck at the winding frame, the first inching movement completion detection reed switch rs6 in the line 166 causes PTM to step up to the step 17 through the contact R7-1 in the line 166, closing the input switch $S_{17}$.

20. With the output switch $P_{17}$ closed, the second materials handling command is issued through the line 108, while the limit switch $LS_5$ in the line 254 in FIG. 11 ascertains the presence of empty boxes E, again energizing the keep relay R8K in the line 255 to effect delivery operation in the manner described above. On the other hand, the truck T delivers the full box F by the second baggage conveyer 44, said full box F closing the limit switch $LS_7$ (FIG. 12) in the line in FIG. 11 to energize the relay R9-1 in the line 261, so that the reception motor IM4 for the reception conveyer RC is driven through its contacts R9-1 in FIG. 6 only during the time when said full box F overlies the limit switches $LS_7$ and $LS_8$. In this case, the limit switch $LS_8$ in the line 263 energizes the keep relay R11K in the line 264, and the relay R12-1 in the line 264 becomes deenergized after it is once actuated. The closing of the contact R10-1 in the line 169 upon completion of delivery of one empty box, the contact R11-1 in the line 170 upon reception of full boxes, and the contact R12-1 in the line 171 upon completion of empty boxes causes PTM to step up to the step 18 through the contact R7-1 in the line 166, closing the input switch $S_{18}$.

21. With the output switch $P_5$ opened and $P_6$ closed, the second truck stop line 26B in FIG. 2 is deenergized while the third truck stop line 26C is energized, causing the inching movement of the truck T. At the same time, with $P_{19}$ closed, the reset relays R8C, R9C, R11C in FIG. 11 are energized through the line 110 in the manner described above, withdrawing the materials handling command. Further, the second inching movement completion detection reed switch rs7 in the line 172 causes PTM to step up to the step 19, closing the input switch $S_{19}$.

22. With the output switch $P_{18}$ closed, the third materials handling command is issued through the line 109 and the full box F on the first baggage conveyer 43 is delivered to the reception conveyer RC in the manner described above. The closing of the limit switch $LS_8$ in te line 178 (indicating the completion of reception) causes PTM to step up to the step 20 through the contact R7-1 in the line 166, closing the input switch $S_{20}$.

23. With the input switch $P_6$ opened and $P_7$ closed, the third truck stop line 26C in FIG. 2 is deeergized while the section between the end line 31a and the home base truck stop line 30 is energized, so that the truck T is moved in the reverse direction to HB, where it is stopped. At the same time, with $P_{19}$ closed, the materials handling command is withdrawn through the line 110 in the manner described above. Further, with the jump switch $P_{25}$ closed, the closing of the home base arrival detection reed switch $rs8$ in the line 152 causes PTM to step up to the step 21 through the lines 174 and 152 in FIG. 5, closing the input switch $S_{21}$. Therefore, PTM is stepped up again to the step 1 through the line 152 and reed switch $rs8$, closing the input switch 1, so that the initial condition ready for a transfer demand signal is re-established.

24. In the step 20, the rotary relay RS is actuated by a subsequent transfer demand signal to close its contact R1 in the line 151, when the output switch $P_{24}$ is closed, energizing the timer TM3. After a delay, the delay contact TM3 in the line 174 causes PTM to step up to the step 21 through the contact R1 in the line 151, closing the input switch $S_{21}$.

25. With the output switch $P_7$ opened and $P_6$ closed, the home base truck stop line 30 is deenergized, while the third truck stop line 26C is energized. At this time, the third truck stop line 26C is detected as a quasi-command signal as if the truck T arrived at HB, so that the truck T is stepped up to the program 1 from the previously described program 13 and is stopped in a quasi-controlled manner. At the same time, with $P_{23}$ closed, the timer TM2 in the line 132 is energized. After a delay enough for the truck T to detect a signal and for a program to be stepped up, the delay contact TM2 in the line 152 causes PTM to step up to the step 1 through the contact R1 in the line 151, closing the input switch $S_1$. At this time, since the contact R1 in the line 151 has been closed, PTM is stepped up to the step 2, ready for the next transfer cycle. In addition, after the truck T has departed for HB, if a transfer signal is issued after the truck T has traveled to the extent that it cannot detect the third truck stop line 26C, the timer TM4 is started in connection with the timer TM3 in the line 133 in such a manner that no step-up takes place even if the contact R1 in the line 151 is closed.

26. This realizes a highly efficient cycle in which when there is no materials handling operation called for, the truck T is withdrawn to HB to get out of the way but when there is a subsequent materials handling operation called for, it travels straight to the next object of transfer in the shortest time. In either case, with $P_{20}$ closed in the step 1, the reset relay R7C in the line 251 in FIG. 11 is energized through the line 111, withdrawing the winding frame designation command.

FIGS. 13-14 show the principal portions of the wiring for the central control unit CCB in another embodiment. A transfer precedence determination unit 50 contained in the central control unit CCB has a controller 52 by which a transfer demand signal from a spinning frame control unit SCB and a setting signal from a constant setting unit 51 for setting allowable waiting time for different spinning frames into a constant register 56 are received through interfaces 54 and 55. The controller 52, activated by periodic signals from a timer 53, carries out the setting, relocation, addition and comparison of values in a group of registers consisting of the constant register unit 56, leftover waiting time register unit 57, frame number and status flag register unit 58, minimum leftover waiting time register 59 and determined frame number register 60. Further, on the basis of said determined frame number register 60, it puts a transfer precedence determination signal $C_1$ into the spinning frame control unit SCB through the interface 61 and lines 601-630. Indicated at PTM is a sequence programmer contained in the central control unit CCB, having operating output switches $P_1$-$P_{26}$ and input switches $S_1$-$S_{21}$ for step-up, a time chart for these switches being shown in FIG. 15.

The operation thereof will now be described in connection with the case where full boxes F containing full bobbins doffed from, e.g., the spinning frame $SP_1$ are transferred to the conveyer system $SC_1$ corresponding to the winding frame $W_1$ for rewinding the same.

In addition, the winding frame $SC_1$ is preset by a pin board matrix MTR as in the case of FIG. 7.

i. In FIG. 14, prior to the operation of the system, the frame numbers of the spinning frames $SP_1$-$SP_{30}$ and the allowable waiting time in minutes corresponding to the single-doffing time (single production cycle) for each of the spinning frames $SP_1$-$SP_{30}$ are set by means of the input digital switch of the constant setting unit 51 and put in by the push-button switch. The controller 52 registers the allowable waiting time signals indicated by the digital switches in the registers for the respective spinning frames in the constant register 56 responsive to the push button signal. In addition, each time the kind of the product and the rate of production are changed, the constant table of the constant register unit 56 can be renewed. At the start of the transfer cycle, in FIG. 15, the sequence programmer PTM is at the step 1, the output switches $P_3$ and $P_6$ are closed, the section between the end line 31a in FIG. 2 and the home base truck stop line 30 is energized and the truck T is stopped at the home base HB.

ii. After the start of the transfer cycle, upon completion of doffing operation of the spinning frame $Sp_1$ the full bobbins are fed from both sides of the spinning frame into two empty boxes on the relay truck $D_1$ positioned at the end of the spinning frame. With a transfer demand signal issued when the boxes become full, the keep relay R4K in the line 202 is energized as in the case of FIG. 9 to energize the relay R4-1 in the line 205 through its contact R4K. With the contact R4-1 in the line 500 in FIG. 14 closed, the transfer demand signal is put into the interface 54 of the transfer precedence determination unit 50 through the line 501.

iii. On the other hand, in accordance with signals from the timer 53, the controller 52 scans the interface 54 to check transfer demand signals at intervals of, e.g., 1 minute. If there is said input, a transfer demand reception flag is set up at the register for $SP_1$ in the frame number and status flag register 58 and said $SP_1$ allowable waiting time in the constant register unit 56 is shifted to the register for $SP_1$ in the leftover waiting time register unit 57. In addition, when there is not transfer demand issued from the spinning frames $SP_1$-$SP_{30}$, this is indicated by a transfer demand generalizing flag in the frame number and status flag register unit 58. Further, when a transfer demand from a transfer demand input frame has already been received, this is checked by said demand reception flag and 1 is subtracted from the corresponding register in the leftover waiting time register unit 57. Thereby, the register in the leftover waiting time register unit 57 which has received the transfer demand will indicate how many minutes said frame can wait for transfer.

At the start of the transfer cycle, the sequence programmer PTM is at the step 1 and the output switch $P_{26}$ in FIG. 15A is closed to issue a transfer precedence determination demand signal $C_2$ to the line 134. Upon receiving this signal, the controller 52 refers to the transfer demand reception generalizing flag, and when there is no transfer demand received, it waits, but when such demands have been received, it extracts from the frame number and status flag register unit 58 the frame number corresponding to that one of the registers in the leftover waiting time register unit 57 which presents the minimum value. In concrete terms, with an optional sufficiently large value put into the minimum leftover waiting time register 59, pairs in the leftover waiting time register unit 57 and frame number and status flag register unit 58 are checked one by one. When a value in a register in the leftover waiting time register unit 57 which has received a transfer demand is less than that of the minimum leftover waiting time register 59, the frame number and the minimum leftover waiting time are shifted to the determined frame number register 60 and the minimum waiting time register 59, respectively. If such operation is repeated for all registers, the frame number having the minimum leftover waiting time will be extracted at the determined frame number register 60. Upon reception of a precedence determined demand signal $C_2$, the controller 52 uses said frame number extraction signal as a precedence determination signal $C_1$ and puts it into one of the input lines 601–630 to the spinning frame control unit SCB through the interface 61, thereby designating one of the spinning frames $SP_1$–$SP_{30}$. In this case, since only the contact R4-1 in the line 500 has been closed, the frame number and leftover waiting time of the spinning frame $SP_1$ have been shifted to the minimum leftover time register 59 and determined frame number register 60, so that the spinning frame $SP_1$ is designated through the line 601.

iv. An input signal in the line 601 energizes the keep relay R5K through the line 206 as in the case of FIG. 9. With the relay R5-1 in the line 208 energized thereby, the relay truck driving motor motor IM1 and baggage conveyer driving motor IM2 (these being shown in FIG. 6), the first and second truck stop lines 11A, 11B and the first and second arrival detecting reed switches $rs3$, $rs4$ (these being shown in FIG. 2), and limit switches LS1–LS4 for detecting the completion of advance of the relay truck, delivery of the full boxes, reception of the empty boxes, and retraction of the relay truck (FIGS. 9 and 10) are connected to the central control unit CCB through the contact R5-1 of said relay R5-1. Thereafter, until the relay R5-1 in the line 208 is deenergized and the spinning frame designation is reset, only the signal from $SP_1$ is fed to CCB while the command from CCB is delivered to $SP_1$ alone.

v. On the other hand, the input signal in the line 601 energizes the relay R2C in the line 640 and the relay R1 in the line 660. The relays R2K and R2C are row determinating relays for transfer-determined frames. Thus, they determine whether a transfer-determined frame belongs to the row of spinning frames $SP_1$–$SP_{15}$ or to the row of spinning frames $SP_{16}$–$SP_{30}$. The relay R1 is used to determine whether or not there is a transfer-determined frame. Then, with the contact R1 in the line 151 in the FIG. 13 closed, PTM is stepped up to the step 2 through the line 140, closing the input switch $S_2$. Thereafter, from the step 2 to the step 19, the operations are the same as in the preceding embodiment.

vi. In the step 20, the input switch $S_{20}$ is closed. With the output switch $P_6$ opened and $P_7$ closed, the third truck stop line 26C in FIG. 2 is deenergized while the section between the end line 31a and the home base truck stop line 30 is energized, so that the truck T is moved in the reverse direction. At the same time, with $P_{26}$ closed, a precedence determination demand signal $C_2$ is put into the controller 50 of the precedence determination unit 50 through the line 134, referring to the transfer demand reception generalizing flag. When there is no transfer demand received, the truck T is moved in the reverse direction to HB and stops there. At the same time, with $P_{19}$ closed, the materials handing command is withdrawn through the line 110 in the same manner as described above. Further, with the jump switch $P_{25}$ closed and the home base arrival detection reed switch $rs8$ in the line 152 closed, PTM is stepped up to the step 21 through the lines 174 and 152, closing the input switch $S_{21}$. Therefore, PTM is stepped up again to the step 1 through line 152 and reed switch $rs8$, closing the input switch $P_1$ to restore the original condition waiting for a transfer demand signal.

vii. In the step 20, if there is a subsequent transfer demand signal and a frame number having the minimum leftover waiting time has been extracted in the determined frame number register 60 of the precedence determination unit 50, a precedence determination demand signal $C_2$ in the line 134 issued upon closing of the output switch $P_{26}$ designates one of the spinning frames $SP_1$–$SP_{30}$ corresponding to the frame number extracted in the determined frame number register 60 and energizes the relay $R_1$ line 660. At the same time, with the output switch $P_{24}$ closed, the timer TM3 is in the line 133 is energized. After a delay, the delay contact TM3 in the line 174 causes PTM to step up to the step 21 through the contact R1 in the line 151, closing the input switch $S_{21}$.

viii. With output switch $P_7$ opened and $P_6$ closed, the home base truck stop line 30 is deenergized while the third truck stop line 26C is energized. At this time, the third truck stop line 26C is detected as a quasi-demand signal as if the truck T arrived at HB, so that the truck T is stepped up to the program 1 from the program 13 and stops at the third truck stop line 26C. At the same time, with $P_{23}$ closed, the timer TM2 in the line 132 is energized and the truck T fully detects the signal. After a sufficient delay to step up the program, the delay contact TM2 in the line 152 causes PTM to step up to the step 1 through the contact R1 in the line 151, closing the input switch $S_1$. At this time, since the contact R1 in the line 151 has been closed, PTM is stepped up to the step 2, ready for the next cycle. In addition, after the truck T has departed for HB, if a transfer demand signal is issued after the truck T has traveled to the extent that it cannot detect the third truck stop line 26C, the timer TM4 is started in connection with the timer TM3 in the line 133 in such a manner that no step-up takes place even if the contact R1 in the line 151 is closed.

What I claim as my invention is:

1. A system for transfer between a delivery work station having one or more locations for delivery of objects of transfer and a reception work station having one or more locations for reception of objects of transfer, at least one of such work stations having a plurality of such locations, said system comprising a guide wire disposed between said stations, said guide wire including sub-wires disposed in rows along said guide wire, a guide truck, and means disposed between one end of each sub-wire and said guide wire for issuing a speed reduction command to said guide truck, said guided truck having guide wire sensors for detecting an electric current in said guide wire, being adapted to perform loading and unloading operations and to depart, stop, travel back and forth and return to its home base in response to signals from said sensors, and a central control unit containing a sequence programmer having output switches for operation and input switches for step-up and adapted to designate a delivery location or reception location in response to a transfer demand signal, issue a materials handling command under control of said sequence programmer in response to control signals including those from detectors associated with said locations, and set or change a section of energization of said wire between said location.

2. A transfer system as set forth in claim 1, including a plurality of truck stop locations along a given sub-wire, the arrangement being such that energization of a section between a given truck stop location corresponding to a given sub-wire location and a suitable location on the guide wire sets a section to be traveled by the guided truck, the speed of the guided truck is reduced through said speed reducing means and after said said speed reduction, and the guided truck is stopped at the given truck stop location corresponding to said given sub-wire location by detecting the absence of electric current after passing by said given sub-wire location.

3. A transfer system as set forth in claim 1, wherein said central control unit includes means for successively scanning terminals to which transfer demand signals are to be applied and designating as the designation the terminal to which a transfer demand signal has been applied.

4. A transfer system as set forth in claim 1, wherein said central control unit includes transfer precedence determining means adapted to set allowable waiting time in a register for a demanded location each time there is a transfer demand signal from such location, continue subtracting the time elapsed from the set registers, select from among the latter the location which has the minimum waiting time when there is a transfer precedence determination demand signal issued upon completion of the transfer operation, and designate it as the destination.

5. A transfer system as set forth in claim 1, wherein said central control unit includes means whereby when there is a transfer demand signal prior to the completion of the transfer cycle effected by said sequence programmer, a quasi home-coming motion is given to the guided truck at the last materials handling location to stop the guided truck in a quasi-controlled manner.

6. A transfer system as set forth in claim 5, wherein said central control unit includes means for cancelling said quasi-controlled truck stopping signal when there is a transfer demand signal prior to the completion of the transfer cycle effected by said sequence programmer and after a suitable period of time has elapsed since the completion of the last materials handling operation.

7. A transfer system as set forth in claim 6, a plurality of truck stop locations along a given sub-wire, the arrangement being such that energization of a section between a given truck stop location corresponding to a given sub-wire location and a suitable location on the guide wire sets a section to be traveled by the guided truck, the speed of the guided truck is reduced through said speed reducing means and after said speed reduction, and the guided truck is stopped at the given truck stop location corresponding to said given sub-wire location by detecting the absence of electric current after passing by said given sub-wire location.

* * * * *